United States Patent [19]

Yoshimura

[11] Patent Number: 4,466,005

[45] Date of Patent: Aug. 14, 1984

[54] AIR BUBBLE REMOVING SYSTEM IN A PRINTER HEAD OF AN INK JET SYSTEM PRINTER OF THE INK ON DEMAND TYPE

[75] Inventor: Hisashi Yoshimura, Kyoto, Japan

[73] Assignee: Sharp Kabushiki Kaisha, Osaka, Japan

[21] Appl. No.: 400,930

[22] Filed: Jul. 22, 1982

[30] Foreign Application Priority Data

Jul. 27, 1981 [JP] Japan ................................ 56-118298

[51] Int. Cl.[3] ............................................ G01D 15/18

[52] U.S. Cl. ................................................ 346/140 R

[58] Field of Search .............................. 346/140 R, 75

[56] References Cited

U.S. PATENT DOCUMENTS 4,245,224 1/1981 Isayama .......................... 346/140 X 4,323,908 4/1982 Lee ..................................... 346/140

*Primary Examiner*—Joseph W. Hartary

*Attorney, Agent, or Firm*—Birch, Stewart, Kolasch & Birch

[57] ABSTRACT

An air bubble removing system is provided in an ink jet system printer of the ink on demand type for removing air bubbles contained in a pressure chamber of a printer head of the ink jet system printer. The air bubble removing system applies a driving signal of various frequencies and having various voltage levels to a piezoelectric transducer attached to the pressure chamber, thereby discharging the air bubbles contained in the ink liquid disposed in the pressure chamber through an orifice provided at one end of the pressure chamber.

12 Claims, 5 Drawing Figures

AIR BUBBLE REMOVING SYSTEM IN A PRINTER HEAD OF AN INK JET SYSTEM PRINTER OF THE INK ON DEMAND TYPE

BACKGROUND AND SUMMARY OF THE INVENTION

The present invention relates to an ink jet system printer and, more particularly, to a printer head in an ink jet system printer of the ink on demand type.

Recently, an ink jet system printer of the ink on demand type has been practically developed, wherein ink droplets are emitted from a printer head at a desired time. In such an ink jet system printer of the ink on demand type, there is a problem that a nozzle orifice is blocked while the ink droplets are not emitted from the printer head for a considerably long period of time, or undesirable air bubbles are contained in an ink liquid disposed in the printer head. The orifice blocking problem is solved by providing an orifice cleaning system in the printer head. However, the air bubble problem is not solved yet.

The above-mentioned air bubbles are contained in the ink liquid disposed in the printer head due to, for example, the incomplete sealing of the printer head. When such air bubbles are contained in the ink liquid disposed in the printer head, the vibration energy supplied from a piezoelectric transducer attached to the pressure chamber is absorbed by the air bubbles. Thus, an accurate droplet formation is precluded.

Accordingly, an object of the present invention is to provide a novel printer head system which ensures an accurate droplet formation in an ink jet system printer of the ink on demand type.

Another object of the present invention is to provide an air bubble removing system for removing air bubbles contained in the ink liquid disposed in a printer head of an ink jet system printer of the ink on demand type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a preselected exciting signal is applied to a piezoelectric transducer attached to a pressure chamber in order to discharge air bubbles through an orifice portion. The exciting signal should have various frequencies and various voltage levels for removing various kinds of air bubbles contained in the ink liquid disposed in the pressure chamber.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

A typical construction of an ink jet system printer of the ink on demand type is disclosed in U.S. Pat. No. 3,747,120, "ARRAGEMENT OF WRITING MECHANSIMS FOR WRITING ON PAPER WITH A COLORED LIQUID", issued July 17, 1973. Another example of the ink jet system printer of the ink on demand type is disclosed in U.S. Pat. No. 3,946,398, "METHOD AND APPARATUS FOR RECORDING WITH WRITING FLUIDS AND DROP PROJECTION MEANS THEREFOR", issued Mar. 23, 1976.

As already discussed above, when air bubbles are contained in the ink liquid disposed in the pressure chamber of the printer head, an accurate droplet formation is not ensured. The present invention is to provide a control system for removing air bubbles contained in the ink liquid disposed in the pressure chamber of the printer head.

Figure 1:
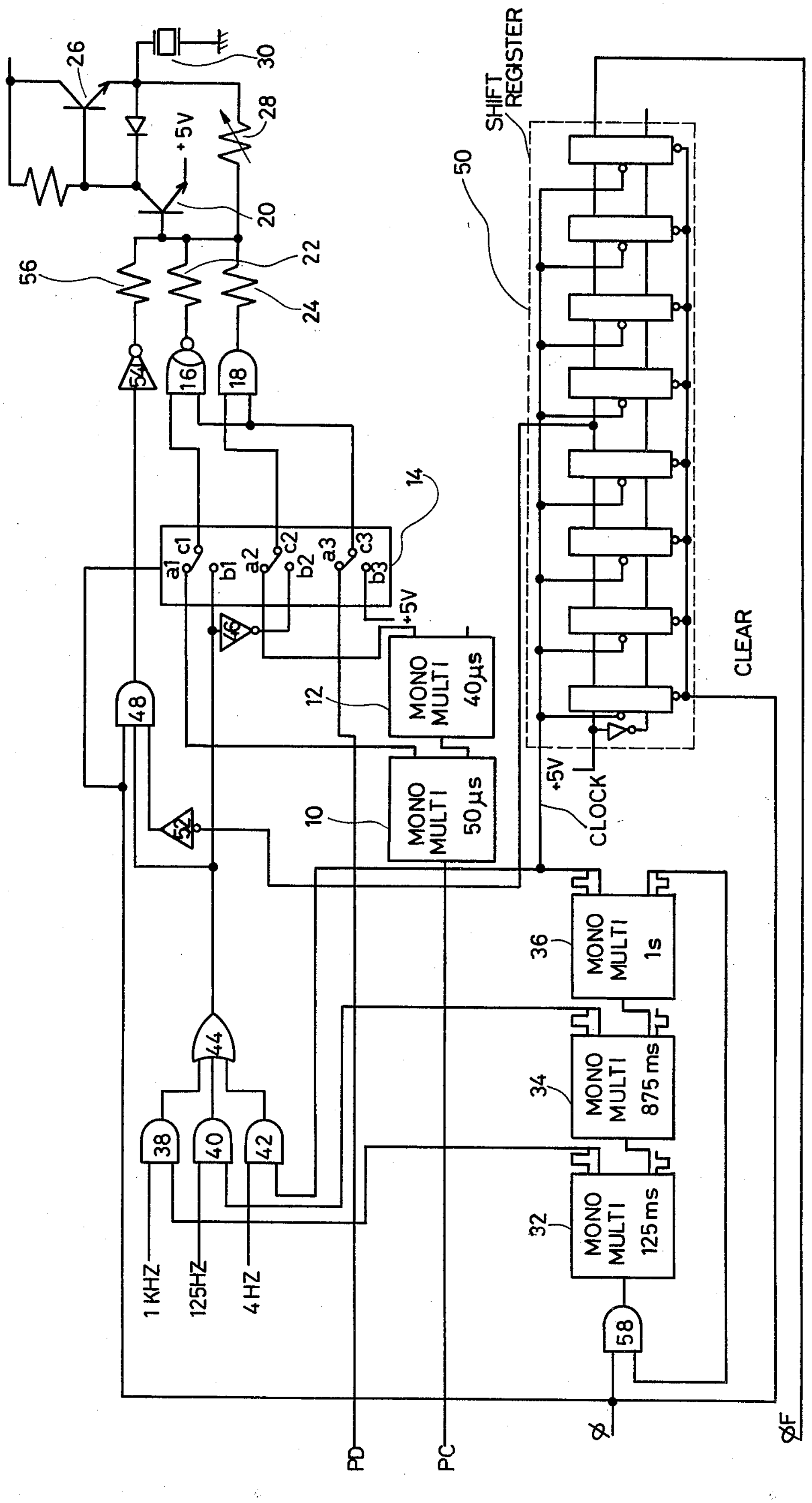
FIG. 1 is a block diagram of an ink jet system printer of the ink on demand type which includes an embodiment of an air bubble removing system of the present invention.

FIG. 1 shows a control circuit of an ink jet system printer of the ink on demand type which includes an air bubble removing system of the present invention. The control circuit includes a normal print control section and an air removal control section. A print data signal PD and a print timing signal PC are applied to the normal print control section for performing the normal printing operation. The normal print control section includes a monostable multivibrator 10 (50 $\mu$seconds), and another monostable multivibrator 12 (40 $\mu$seconds). The control circuit further includes a selector 14 of which selection terminals $a_1$, $a_2$ and $a_3$ are connected to corresponding common terminals $c_1$, $c_2$ and $c_3$ when the system is placed in the normal printing operation mode, and selection terminals $b_1$, $b_2$ and $b_3$ are connected to the common terminals $c_1$, $c_2$ and $c_3$, respectively, when the system is placed in the air bubble removing operation mode. More specifically, the selector 14 functions to connect the selection terminals $b_1$, $b_2$ and $b_3$ with the corresponding common terminals $c_1$, $c_2$ and $c_3$ when an air purge signal $\phi$ is applied to the control circuit. The air purge signal $\phi$ is developed when the air removing operation is desired to be conducted. That is, when an air bubble detection system detects that air bubbles are contained in the ink liquid disposed in the pressure chamber, the air bubble detection system develops the air purge signal $\phi$ which functions to place the control system of the present invention in the air bubble removing operation mode. An example of the air bubble detection system is disclosed in Japanese patent application No. 56-118762, "INK JET RECORDING APPARATUS", filed on July 28, 1981 and assigned to Sharp Kabushiki Kaisha.

Output signals derived from the common terminals $c_1$ and $c_3$ of the selector 14 are applied to a NAND gate 16, and output signals derived from the common terminals $c_2$ and $c_3$ of the selector 14 are applied to an AND gate 18. Output signals of the NAND gate 16 and the AND gate 18 are applied to the base electrode of a transistor 20 via resistors 22 and 24, respectively. The output signal of the AND gate 18 is further applied to the emitter electrode of an output transistor 26 via a variable resistor 28. The emitter electrode of the output transistor 26 is connected to a piezoelectric transducer 30 which is attached to an oscillation plate connected to a pressure chamber of the printer head.

When the print data signal PD and the print timing signal PC are applied to the control circuit shown in FIG. 1, the monostable multivibrator 10 is switched on so that the output signal of the NAND gate 16 bears the logic "0". The voltage level applied to the base electrode of the transistor 20 becomes low and, therefore, the output voltage level of the transistor 20 becomes high. When the monostable multivibrator 10 is switched off after 50 μseconds, the monostable multivibrator 12 is switched on so that the output signal of the AND gate 18 bears the logic "1". The voltage level applied to the base electrode of the transistor 20 becomes high to cut off the output transistor 26 for 40 μseconds.

Figure 2:
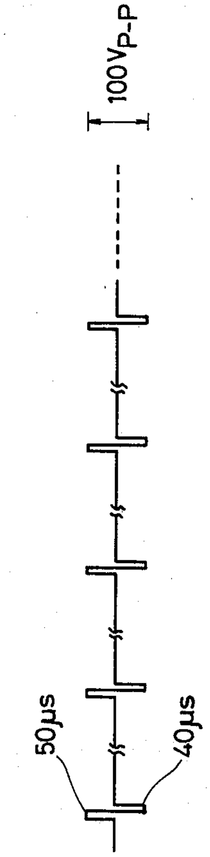
FIG. 2 is a waveform chart for explaining a normal printing operation mode of the ink jet system printer of the ink on demand type of FIG. 1.

In this way, in the normal printing operation mode, the monostable multivibrators 10 and 12 are alternatively switched so that a drive signal as shown in FIG. 2 is applied to the piezoelectric transducer 30. The variable resistor 28 is selected to have the resistance value suited for maintaining the voltage level of the drive signal applied to the piezoelectric transducer 30 at 100 $V_{p-p}$.

The air removal control section includes a monostable multivibrator 32 (125 milliseconds), a monostable multivibrator 34 (875 milliseconds) and a monostable multivibrator 36 (1 second). Output signals of the monostable multivibrators 32, 34 and 36 are applied to AND gates 38, 40 and 42, respectively. The other input terminal of the AND gate 38 receives a frequency signal of 1 KHz. The other input terminal of the AND gate 40 receives a frequency signal of 125 Hz. The other input terminal of the AND gate 42 receives a frequency signal of 4 Hz. The respective AND gates 38, 40 and 42 function to gate the corresponding frequency signals in response to the output signals of the monostable multivibrators 32, 34 and 36.

Output signals of the AND gates 38, 40 and 42 are applied to an OR gate 44. An output signal of the OR gate 44 is applied to the selection terminal $b_1$ of the selector 14, and to the selection terminal $b_2$ of the selector 14 via an inverter 46. The output signal of the OR gate 44 is further applied to one input terminal of an AND gate 48. The air removal control section further includes an eight bit shift register 50. An output signal of the fourth bit of the eight bit shift register 50 is applied to one input terminal of the AND gate 48 via an inverter 52. The remaining input terminal of the AND gate 48 receives the above-mentioned air purge signal $\phi$. An output signal of the AND gate 48 is applied to the base electrode of the transistor 20 via an inverter 54 and a resistor 56. The resistor 56 is selected to have the resistance value suited for maintaining the voltage signal applied to the piezoelectric transducer 30 has the level 300 $V_{p-p}$. The air purge signal $\phi$ is further applied to the eight bit shift register 50 as a clear signal. An output signal of the monostable multivibrator 36 is applied to the eight bit shift register 50 as a clock signal. Therefore, the eight bit shift register 50 performs the shift-up operation when the monostable multivibrator 36 is switched on. An output signal of the eighth bit of the eight bit shift register 50 is used as an air purge completion indicating signal $\phi F$.

When the air purge signal $\phi$ is applied to the control circuit of the present invention, the selector 14 is switched to connect the selection terminals $b_1$, $b_2$ and $b_3$ with the common terminals $c_1$, $c_2$ and $c_3$, respectively. The air purge signal $\phi$ is applied to the monostable multivibrator 32 via an AND gate 58 to switch on the monostable multivibrator 32. The AND gate 38 is made conductive to apply the frequency signal of 1 KHz to the NAND gate 16 and the AND gate 18 via the OR gate 44 and the selector 14 for 125 milliseconds. Since the output signal of the AND gate 48 bears the logic "1", the output signal of the inverter 54 bears the low level. Furthermore, the output signal of the NAND gate 16 bears the low level. Accordingly, the voltage level applied to the base electrode of the transistor 20 is low so as to develop the drive signal from the output transistor 26 of the level 300 $V_{p-p}$ which is determined by the resistor 56. That is, the drive signal of 300 $V_{p-p}$ and 1 KHz is applied to the piezoelectric transducer 30 for 125 milliseconds.

Figure 3:
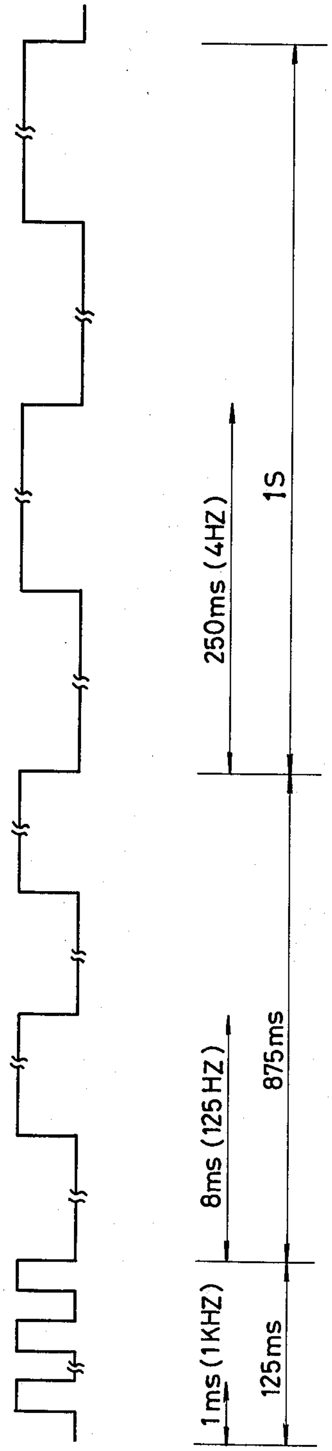
FIG. 3 is a waveform chart for explaining an air bubble removing operation mode of the ink jet system printer of the ink on demand type of FIG. 1.

When the monostable multivibrator 32 ia switched off, the following monostable multivibrator 34 is switched on. Thus, the drive signal of 300 $V_{p-p}$ and 125 Hz is applied to the piezoelectric transducer 30 for 875 milliseconds. Thereafter, when the monostable multivibrator 34 is switched off, the following monostable multivibrator 36 is switched on. Thus, the drive signal of 300 $V_{p-p}$ and 4 Hz is applied to the piezoelectric transducer 30 for one second. FIG. 3 shows the cycle of the abovementioned drive signal. This cycle is repeated by four times. Then, the fourth bit of the eight bit shift register 50 develops the control signal to turn off the AND gate 48. The output signal of the inverter 54 bears the logic "1" and, therefore, the voltage level of the drive signal of the remaining four cycles is changed to 100 $V_{p-p}$. The frequency of the drive signal in the remaining four cycles is same as that of the first four cycles. When the operation is conducted to the eighth cycle, the eight bit shift register 50 develops the air purge completion indicating signal $\phi F$ to terminate the air bubble removing operation.

That is, in accordance with the present invention, three frequencies, 1 KHz, 125 Hz and 4 Hz, are used in one cycle of driving of the piezoelectric transducer 30. This cycle is repeated by four times at the voltage level of 300 $V_{p-p}$ and, then, the following four cycles are conducted with the voltage level of 100 $V_{p-p}$. Each one cycle takes two seconds.

When the piezoelectric transducer 30 is driven in this manner, the air bubbles contained in the ink liquid disposed in the pressure chamber are forced to move upwards in the pressure chamber due to the oscillation and discharged through the nozzle in unison with the emitting ink liquid.

Figure 4:
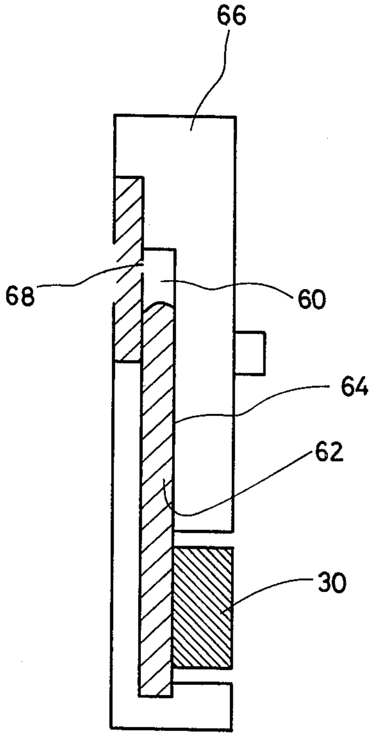
FIGS. 4 and 5 are schematic sectional views showing air bubbles contained in a pressure chamber of a printer head in the ink jet system printer of the ink on demand type of FIG. 1.

FIG. 4 shows a condition where a considerably great amount of air bubbles 60 is included in ink liquid 62 disposed in a pressure chamber 64 of a printer head 66. In this condition, the low frequency drive signal applied to the piezoelectric transducer 30 is effective to discharge the air bubbles 60 through an orifice 68 of the pressure chamber 64.

Figure 5:
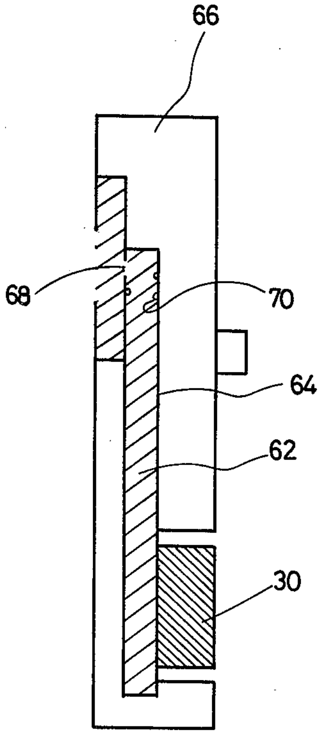

FIG. 5 shows a condition where a small amount of air bubbles 70 attaches to the inner surface of the pressure chamber 64. In this condition, the high frequency drive signal applied to the piezoelectric transducer 30 is effective to discharge the air bubbles 70 through the orifice 68 of the pressure chamber 64. As already discussed above, in accordance with the control circuit of the present invention, the frequency of the drive signal is changed so that the both types of air bubbles are effectively discharged through the orifice 68. Since the voltage level is reduced at the last four cycles, there is no possibility that the air is introduced through the orifice 68 into the pressure chamber 64 during the air bubble removing operation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer of the ink on demand type which includes a printer head comprising a pressure chamber of which one end is provided with an orifice means for emitting ink droplets therethrough, and the other end is connected to an electro-mechanical transducer for suddenly reducing the volume of said pressure chamber, the improvement comprising:

an air bubble removing system for applying a preselected driving signal to said electro-mechanical transducer so as to discharge air bubbles contained in ink liquid disposed in said pressure chamber through said orifice means including a first control means for applying a driving signal of a first preselected voltage level and having at least two different frequencies in a predetermined cycle to said electro-mechanical transducer;

a second control means for applying a driving signal of a second preselected voltage level and having at least two different frequencies in a predetermined cycle to said electro-mechanical transducer; and a third control means for energizing said first control means and, then, said second control means.

2. The ink jet system printer of the ink on demand type of claim 1, wherein said first preselected voltage level is higher than said second preselected voltage level.

3. The ink jet system printer of the ink on demand type of claim 2, wherein said first preselected voltage level is 300 $V_{p-p}$ and said second preselected voltage level is 100 $V_{p-p}$.

4. The ink jet system printer of the ink on demand type of claim 1, 2 or 3, wherein said predetermined cycle includes:

a first period wherein the frequency of said driving signal is 1 KHz;

a second period wherein the frequency of said driving signal is 125 Hz; and a third period wherein the frequency of said driving signal is 4 Hz.

5. The ink jet system printer of the ink on demand type of claim 4, wherein one cycle is completed in two seconds.

6. The ink jet system printer of the ink on demand type of claim 5, wherein said control means functions to repeat said first cycle four times and subsequently functions to repeat said second cycle four times.

7. The ink jet system printer of the ink on demand type of claim 5, wherein said first control means functions to repeat said cycle by four times, and said second control means functions to repeat said cycle by four times.

8. In an ink jet system printer of the ink on demand type which includes a printer head comprising a pressure chamber of which one end is provided with an orifice means for emitting ink droplets therethrough, and the other end is connected to an electro-mechanical transducer for suddenly reducing the volume of said pressure chamber, the improvement comprising:

an air bubble removing system for applying a preselected driving signal to said electro-mechanical transducer so as to discharge air bubbles contained in ink liquid disposed in said pressure chamber through said orifice means including control means for applying a first driving signal of a first voltage level and having at least two different frequencies in a first predetermined cycle and subsequently, a second driving signal of a second voltage level and having at least two different frequencies in a second predetermined cycle to said electro-mechanical transducer.

9. The ink jet system printer of the ink on demand type of claim 8, wherein said first voltage level is higher than said second voltage level.

10. The ink jet system printer of the ink on demand type of claim 9, wherein said first voltage level is 300 $V_{p-p}$ and second voltage level is 100 $V_{p-p}$.

11. The ink jet system printer of the ink on demand type of claim 8, 9, or 10, wherein said predetermined cycle includes:

a first period wherein the frequency of said driving signal is 1 KHz;

a second period wherein the frequency of said driving signal is 125 Hz; and a third period wherein the frequency of said driving signal is 4 Hz.

12. The ink jet system printer of the ink on demand type of claim 11, wherein each said cycle is completed in two seconds.

* * * * *